United States Patent Office 3,598,877
Patented Aug. 10, 1971

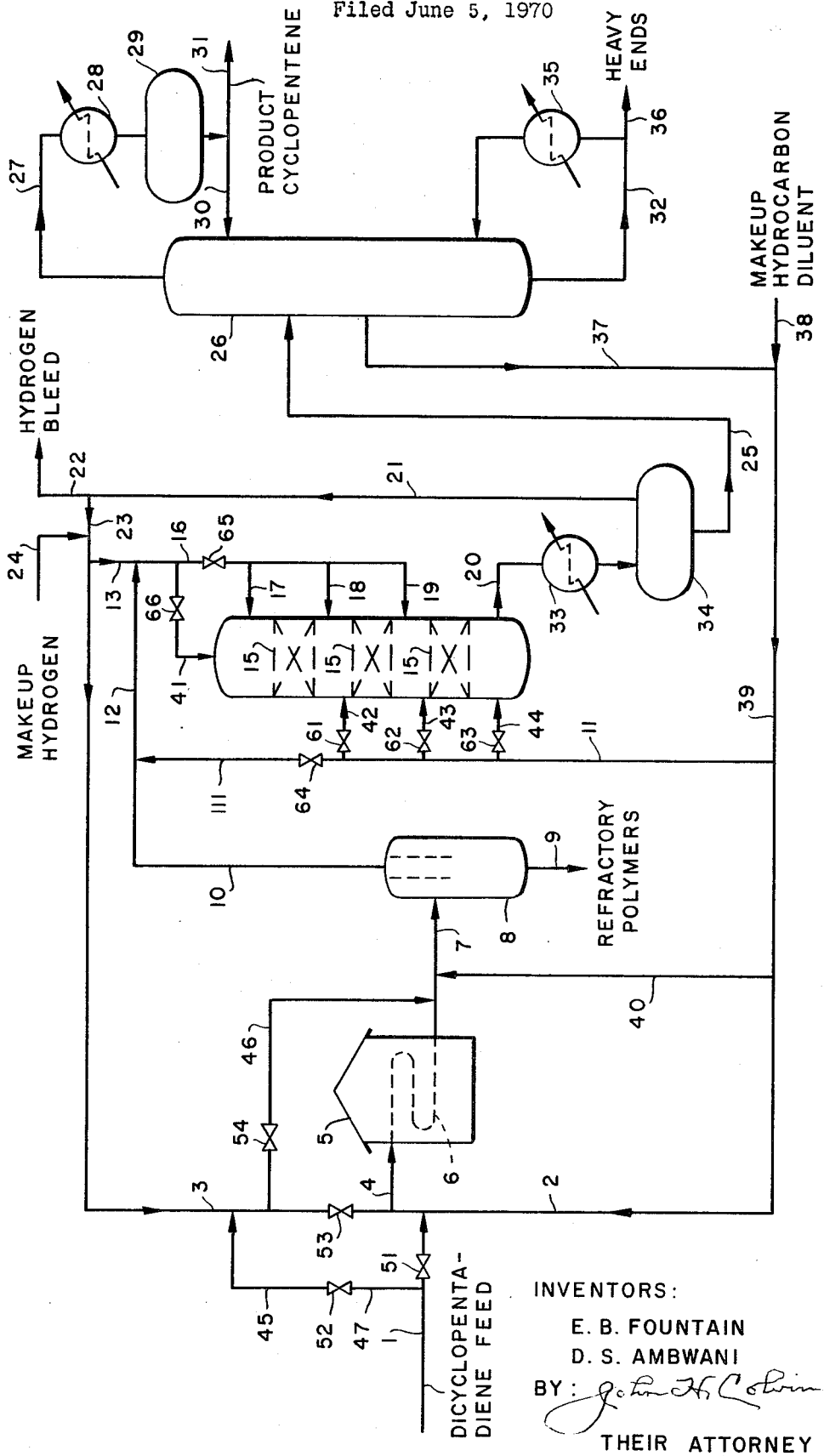

3,598,877
CYCLODIOLEFIN HYDROGENATION
Eugene B. Fountain, Berkeley, and Durga S. Ambwani, Oakland, Calif., assignors to Shell Oil Company, New York, N.Y.
Filed June 5, 1970, Ser. No. 43,878
Int. Cl. C07c 3/26
U.S. Cl. 260—666A                                      8 Claims

ABSTRACT OF THE DISCLOSURE

Dicyclopentadiene is depolymerized to monomeric cycyopentadiene, and the monomer selectively hydrogenated to cyclopentene with high overall selectivity by thermally depolymerizing the dicyclopentadiene in admixture with hydrogen and an hydrocarbon diluent at a sufficiently high pressure to allow introduction of the cracked products directly into the hydrogenation reactor, and then selectively hydrogenating the cyclopentadiene to cyclopentene in the presence of an hydrogenation catalyst, such as sulfided nickel oxide.

This invention relates to a process by which a cyclic monoolefinic hydrocarbon is continuously manufactured from the corresponding cyclic diene dimer in a two-step process. More specifically, the invention involves improvements in the vapor phase depolymerization of dicyclopentadiene to monomeric cyclopentadiene, the benefits of which accrue to selective catalytic hydrogenation of the latter to cyclopentene.

BACKGROUND OF THE INVENTION

There is considerable interest in the production of cyclopentene from low cost cyclopentadiene, available in substantial quantities from the cracking of naphtha, gas oils, and other hydrocarbon fractions. The most useful reaction for producing cyclopentene available in the past has been the dehydration of cyclopentanol. Cyclopentene is useful for preparing cyclic aldehydes, alcohols, chloro-compounds, and fuels. Despite its attractive properties as a monomer for polymerization into high molecular weight homo- and co-polymers, the cost of cyclopentene in the past has been so high as to preclude its large scale use for this purpose.

Cyclopentadiene monomer may be produced by the liquid or gas phase thermal cracking, or depolymerization, of dicyclopentadiene. When substantially pure liquid dicyclopentadiene is subjected to a decomposing distillation, the yield of monomer is relatively low, due to the formation of substantial quantities of trimers, tetramers, and higher polymers, which are not readily decomposed to the monomer.

A variety of processes has been disclosed which propose to crack dimeric cyclopentadiene to the monomer in the presence of an auxiliary liquid. British Celanese, Ltd. (Brit. 612,893) suggests the depolymerization of dicyclopentadiene by heating it in a hydrocarbon fraction which boils within the range of 190° to 250° C. Unfortunately, the monomer yield from this process is low, somewhat on the order of 70 percent. To raise the monomer yield, Chemische Werke Huls (Brit. 769,813) and Kreps (U.S. 2,831,904) propose to introduce the dimer into an auxiliary liquid boiling at 250° to 350° C., such as diphenyl ether, or into a hydrocarbon fraction boiling within this range. Generally, the concentration of monomer plus dimer must be maintained below about 5% by weight, although the yields are stated to be about 96 to about 99%, basis dimer. Such low concentrations necessarily entail the circulation and recovery of large quantities of auxiliary liquid. Dick et al. (U.S. 3,016,410) propose to depolymerize the dimer in dilute solutions of a solvent, such as toluene or light aliphatic hydrocarbons, which vaporize at a temperature above the boiling point of the monomer but below that of the dimer. Heat for the endothermic depolymerization is supplied by immersion heaters, with specific limitations on the amount of surface area per unit volume of liquid reaction medium. While the process gives almost quantitative yields, wire-type immersion heaters are generally not appropriate to large scale, industrial reactors.

Because of these difficulties, monomeric cyclopentadiene may be manufactured on an industrial scale via vapor phase processes. Generally, the dimer is vaporized and the resulting gas is conveyed through a heated tubular reactor, wherein cracking to the monomer occurs. Since the depolymerization is reversible even at low temperatures, the monomer must be fractionated rapidly and at low temperatures and residence times, if reasonable and economic quantities of the monomer are to be recovered. Nelson et al. (U.S. 2,801,270) and Hillard, Jr. et al. (U.S. 2,913,504) have proposed elaborate resolution schemes for recovering the monomer.

Vapor phase cracking of cyclopentadiene dimer and higher polymers results in a greater conversion to the monomer, as compared to liquid phase cracking, but a serious drawback associated with vapor phase cracking is the formation of coke on the inner walls of the cracking tubes. Inert gas addition to the vaporized dimer has been proposed to alleviate this difficulty, although Nelson et al. (U.S. 2,801,270) indicate that the process may be operated efficiently without such addition, and that such addition may actually hinder the separation of the monomer from the other materials in the cracking reactor effluent.

Whether obtained by the liquid or vapor phase process, extreme care must be exercised in processing monomeric cyclopentadiene. This is so because the monomer rapidly reverts to its dimeric state. At 100° F., for instance, 12 percent of a given quantity of monomer will dimerize in less than 20 minutes. As might be expected, the polymerization is much more rapid at higher temperatures.

To manufacture the desired cyclopentene from thermally unstable monomeric cyclopentadiene in an economic fashion, it is necessary to selectively hydrogenate the diolefin under conditions which minimize the formation of any substantial quantity of the corresponding cyclic, saturated product and at the same time minimizes dimerization of the diene. A variety of catalysts has been proposed for this purpose. Greensfelder et al. (U.S. 2,402,493) disclose the use of nickel sulfide. Banes et al. (U.S. 2,793,238) suggest that monomeric cyclopentadiene may be selectively hydrogenated over a catalyst consisting of metallic nickel in admixture with a small modifying amount of zinc oxide. Noeske et al. (U.S. 2,887,517) form the monomer by depolymerizing dimeric cyclopentadiene over a mass of iron filings, and immediately thereafter hydrogenate the monomer by passing it, in the vapor state, along with hydrogen, over a catalyst selected from the group consisting of (a) nickel and magnesia, (b) nickel and chromia, (c) nickel and aluminum, and (d) cobalt-containing Fischer carbon monoxide hydrogenation catalysts. Spencer et al. (U.S. 3,009,969) propose to pass conjugated diolefins and hydrogen through an aqueous solution of a soluble salt of divalent cobalt, which also contains an alkali metal cyanide. An hydrogenation catalyst consisting of a mixture of metallic palladium and the salts, hydroxides and oxides of a heavy metal, especially zinc and lead, has been suggested by Seefelder et al. (U.S. 3,251,892).

While the two steps of preparing cyclopentene from dicyclopentadiene have been well documented in the patent literature, as hereinabove described, the relatively limited supplies of the monoolefin available in the marketplace, along with the relatively expensive nature of those supplies, attest to the fact that these reactions have as yet to be coupled successfully on an industrial scale to yield an integrated, economic process. Factors which heretofore have prevented the combination of these two steps in a single plant include the high temperature at which the dimer must be cracked, the propensity of the dimer to coking, the thermal instability of the monomer and the need to rapidly quench and recover it from the cracking reactor effluent, the need to repressurize and reheat the monomer prior to hydrogenation with concurrent risk of redimerization, "over-hydrogenation" of the diolefin to cyclopentane, and deposition of redimerized cyclopentadiene on the hydrogenation catalyst.

BRIEF SUMMARY OF THE INVENTION

It has now been discovered that these disadvantages may be avoided, and that dicyclopentadiene may be depolymerized to monomeric cyclopentadiene, and the monomer selectively hydrogenated to cyclopentene with high overall selectivity, and with negligible coke and minimum cyclopentane formation, when the dicyclopentadiene is depolymerized while admixed with hydrogen and an inert hydrocarbon diluent at a sufficiently high pressure to allow introduction of the cracked products directly into the hydrogenation reactor, followed by selective hydrogenation of the cyclopentadiene in the cracked product stream in the presence of a hydrogenation catalyst. The invention will be described in greater detail with reference to the accompanying drawing, in which the sole figure is a schematic flow diagram of one system for carrying out the process of the invention.

DESCRIPTION OF THE PREFERRED EMBODIMENTS

Operation of the integrated process of this invention proceeds in the following manner. A dicyclopentadiene feedstock, which may contain some isoprene-cyclopentadiene codimers, is mixed with hydrogen and a hydrocarbon diluent, and passed through a cracking furnace, the first section of which may function as a preheater and vaporizer. Effluent from the furnace, after quenching, is separated into two phases: the monomer, hydrogen, and hydrocarbon diluent being recovered as a vapor, and any unconverted dimer and/or refractory polymer formed, if any, separately recovered as a liquid. Depending on the temperature at which the hydrogenation is to be carried out, generally lower than that of the depolymerization, an additional portion of liquid hydrocarbon diluent may be added to the monomer-rich vapor. This stream is then passed to the hydrogenation reactor, wherein cyclopentene is selectively formed over a suitable hydrogenation catalyst. A variety of techniques may be employed to control the hydrogenation reaction exotherm. After cooling the effluent, hydrogen is separated and recycled. The remaining hydrocarbons are then fed to a decyclopentenizer where product cyclopentene is recovered as a top product. Generally, the recovered cyclopentene will be 90% or greater purity, being contaminated with only small quantities of cyclopentane, amylenes, and, perhaps, some cyclopentadiene. The hydrocarbon diluent may be conveniently recovered as a side product in the decyclopentenizer. For a higher purity cyclopentene, overhead from the decyclopentenizer may be subjected to a variety of techniques, such as extractive distillation with acetonitrile, N-methyl pyrrolidone, or dimethyl formamide.

The distinguishing and advantageous feature of this invention, from which completely unexpected and beneficial results accrue, is the mixing of hydrogen with dicyclopentadiene prior to the thermal depolymerization. When this mixture, along with a hydrocarbon diluent, is passed through the cracking furnace, the previously encountered problem of coke formation is essentially eliminated. In cracking the doubly unsaturated dimer in the presence of hydrogen, no saturation of olefinic bonds occurs. By subjecting the mixture of dicyclopentadiene, hydrogen, and inert hydrocarbon diluent to a sufficiently high pressure within the depolymerization furnace, the effluent therefrom can be sent directly to the hydrogenation reactor, without intermediate condensation and recovery of the monomer. Such a procedure not only eliminates the need for a distillation scheme for recovering the monomer, as disclosed by the prior art, but also minimizes the possibilities of reversion of the monomer to the dimer and/or yield losses to higher refractory polymers.

The molar ratio of hydrogen to dicyclopentadiene in the feed to the cracking furnace may be varied within wide limits. Generally this ratio will be greater than 1.0. A particularly desirable range of ratios for hydrogen to dicyclopentadiene lies between about 5.0 and 50.0. The preferred range of ratios is between about 8.0 and about 40.0.

The pressure maintained within the vapor phase cracking furnace will in all cases be superatmospheric, and will depend upon the amount of hydrogen in the feed thereto, as well as the temperature maintained therein. The thermal depolymerization may be conducted at a temperature within the range of about 200° to about 400° C., and is preferably effected at a temperature of about 250° to about 350° C. Under such temperature conditions, and for various hydrogen to dicyclopentadiene ratios, the pressure within the depolymerization furnace will generally lie between about 50 and about 500 p.s.i.g. The preferred operating pressure maintained in the cracking furnace is from about 75 to about 250 p.s.i.g.

The criteria for selecting the hydrocarbon diluent are four-fold: (1) the diluent must be easily separable from any of the cyclic $C_5$ materials present in the system; (2) the diluent must be inert to conditions prevailing within the cracking and the hydrogenation zones; (3) the diluent should have a moderate to high heat of vaporization, so as to aid in controlling the hydrogenation exotherm by volatilization; and (4) the diluent must be readily available and inexpensive. In criteria (1) a diluent which is "easily separable" is one which either (a) is more volatile than any member of the group of cyclic $C_5$s consisting of cyclopentene, cyclopentane, and cyclopentadiene, (b) is less volatile than any member of that group while at the same time being more volatile than dicyclopentadiene, or (c) is less volatile than the dimer. Selected species of aromatic and saturated, aliphatic and cyclic hydrocarbons, as outlined hereinafter, satisfy all these criteria.

Suitable saturated hydrocarbons which are more volatile than any cyclic $C_5$ materials present in the system include, but are not limited to, propane, butane, isobutane and pentane and isopentane. Mixtures may also be employed. Satisfactory, saturated hydrocarbon diluents, which are less volatile than any of cyclopentene, cyclopentane, and cyclopentadiene, but more volatile than dicyclopentadiene, may be divided into three groups: $C_6$ to $C_9$, aliphatic hydrocarbons; $C_6$ to $C_9$ substituted and unsubstituted, cyclic hydrocarbons; and hydrocarbon fractions boiling within the indicated range. Suitable saturated, aliphatic hydrocarbons include the mono-, di-, tri-, and tetra-methyl pentanes, the mono- and di-ethyl pentanes, the ethylmethyl pentanes, propyl- and butyl-pentane, the mono, di-, and tri-methyl hexanes, the ethyl pentanes, the ethylmethyl pentanes, the propyl and iso-propyl pentanes, the mono- and di-methyl heptanes, the ethylheptanes, the methyl octanes, as well as hexane, heptane, octane, and nonane. Suitable $C_6$ to $C_9$ substituted and unsubstituted cyclic hydrocarbons may contain five to nine carbon atoms in the ring. Representative cyclic materials include cyclohexane, cycloheptane, cyclooctane, cyclononane, the mono-, di-, tri-, and tetra-methylcyclopentanes, the mono- and di-ethylcyclopentanes, the propyl- and butyl-cyclopentanes, the mono-, di, and tri-methylcyclohexanes, the ethyl and ethylmethyl-cyclohexanes, the propylcyclohexanes, the methyl- and ethyl-cycloheptanes, and methylcyclooctane. Representative hydrocarbon fractions which are suitable for use as a diluent include such commercially available solvents as Shellsol–260, Isopar E, and Chevron 150 and/or 264, manufactured by the Shell Chemical Company, Enjay Chemical Company, and Chevron Chemical Company, respectively.

A variety of aromatic hydrocarbons, preferably monocyclic, containing six to nine or more carbon atoms, may be employed as the diluent with equal facility. From this group of materials, the preferred diluents are benzene, toluene, ethylbenzene, the xylenes, and the methylethylbenzene isomers, as well as their mixtures.

A variety of catalysts, which are effective for the selective hydrogenation of cyclopentadiene monomer produced in the cracking furnace, may be employed. Sulfided nickel oxides are preferred. Thus nickel sulfide itself, as disclosed by Greensfelder (U.S. 2,402,493), or sulfided, commercially available materials, such as, for example, Harshaw Chemical Company type Ni 0301 T nickel-on-alumina, provide the desired selective hydrogenation of cyclopentadiene to cyclopentene with a minimum of cyclopentane formation.

The hydrogenation reaction may be carried out under a pressure of from about 50 to about 250 p.s.i.g., and at a temperature lying within the range of from about 175° to about 350° C. Because a large exotherm occurs during hydrogenation of the cyclopentadiene, a variety of means may be employed to aid in removing the heat generated. One technique is to add additional hydrocarbon diluent to the feed to the hydrogenation zone. Another is to dilute the hydrogenation catalyst with an inert material, whose concentration throughout the catalyst bed is uniform, or which is initially high and decreases in the direction of flow. A third technique incorporates the previous two, and, in addition, divides the cyclopentadiene monomer-rich feed and the total volume of catalyst into an equal number of streams and beds, respectively, and introduce the divided streams below or between the separate beds.

DESCRIPTION OF THE DRAWING

The schematic flow diagram of the drawing illustrates a general arrangement of apparatus which may be used in the preferred embodiment of the invention. In the drawing, the inert hydrocarbon diluent is selected from the group consisting of $C_6$ to $C_9$ aliphatic hydrocarbons, $C_6$ to $C_9$ cyclic hydrocarbons, hydrocarbon fractions boiling between cyclopentane and dicyclopentane, and $C_6$ to $C_9$ aromatic hydrocarbons. Without departing from the spirit of this invention modifications will suggest themselves to those skilled in the art.

With valves 51 and 53 open, and valves 52 and 54 closed, dicyclopentadiene, recovered from the cracking of naphtha, gas oil or other hydrocarbon fractions is fed to the process through line 1, where it joins with recycle hydrocarbon diluent and hydrogen flowing in lines 2 and 3, respectively. Combined stream 4 flows to furnace 5, in tubes 6 of which the dicyclopentadiene is depolymerized to monomeric cyclopentadiene. The effluent from the cracking furnace, which may optionally be cooled by the addition thereto of additional diluent from stream 40, flows through line 7 into a knockout pot 8, from which any unconverted dicyclopentadiene and/or refractory polymers are removed as a liquid via stream 9. The vapor from the knockout pot, consisting of hydrogen, hydrocarbon diluent, and monomer, flows through line 10, and with valves 61, 62, and 63 closed and valve 64 open, is optionally cooled somewhat by the addition of hydrocarbon diluent flowing in lines 11 and 111. Closing valves 66 and opening valve 65, the hydrocarbon-diluted, monomeric cyclopentadiene is mixed with hydrogen flowing in line 13 to form the total feed to the hydrogenation reactor, stream 16. Within hydrogenator 14, a suitably selective hydrogenation catalyst is divided into a multiplicity of beds 15 (three being shown, for purposes of illustration), which may or not be diluted with inert filler. Here, feed 16 to hydrogenator 14 is divided into three sub-feeds, 17, 18 and 19, which are introduced above each of the catalyst beds in the hydrogenator. Vaporization of the hydrocarbon diluent contained in sub-feeds 17, 18 and 19 aids in controlling the temperature within the hydrogenator. The effluent from the hydrogenator, consisting mainly of cyclopentene, but containing diluent and some unreacted hydrogen, flows through line 20, is cooled in heat exchanger 33, and enters phase separator 34. Gaseous hydrogen leaves the phase separator through line 21, a portion of which is removed from the system as a bleed through line 22, the remainder flowing through line 23 to be joined by makeup hydrogen flowing in line 24. The combined hydrogen stream is returned to the furnace through line 3.

Liquid leaving phase separator 34 through line 25, containing cyclopentene of 90% or greater purity, enters decyclopentenizer 26. An overhead vapor leaves the decyclopentenizer through line 27, is liquified in condenser 28, and accumulates in vessel 29. A portion of the cyclopentene is returned to the decyclopentenizer as reflux through line 30, the remainder exiting the process as product cyclopentene through line 31. A portion of the liquid removed from the bottom of the decyclopentenizer in line 32 is sent, via line 36, to recovery of any hydrocarbon diluent therein and disposal of $C_{10}$ and higher boiling materials. The remainder of the liquid flowing in line 32 is returned to the decyclopentenizer after being vaporized in reboiler 35.

At a suitable location in decyclopentenizer 26, a sidestream, consisting essentially of the hydrocarbon diluent, is removed and recycled through line 37. The flow of hydrocarbon diluent in line 37 is augmented by makeup diluent introduced via line 38. The combined recycle hydrocarbon diluent, stream 39, is then divided between that required as diluent in the cracking furnace, stream 2, that used to cool the feed to the hydrogenation reactor, stream 11, and that which assists in cooling the effluent from the cracking furnace, stream 40.

Without departing from the spirit of the invention, a number of variations in the flow scheme shown in the drawing are possible. For instance, when relatively cool dicyclopentadiene is introduced into hot hydrocarbon diluent, cracking to the monomer occurs. Such a procedure is achieved by (a) closing valve 51 and passing all the dicyclopentadiene flowing in line 1 through line 47, open valve 52, and line 45, so as to mix with hydrogen flowing in line 3; (b) routing the entire hydrogen-dicyclopentadiene mixture, by closing valve 53 and opening valve 54, to line 46 instead of furnace 5; (c) employing furnace 5 merely as a heater for hydrocarbon diluent flowing in lines 2 and 4; and (d) introducing the hydrogen-dicycloenptadiene mixture flowing in line 46 into hot hydrocarbon diluent exiting furnace tubes 6.

Variations in the method of effecting the hydrogenation are possible. In one alternative, valves 64 and 65 are closed, and valves 61, 62, 63 and 66 are open. The hydrocarbon-diluted and -cooled monomeric cyclopentadiene flowing in line 12 is mixed with hydrogen passing through line 13. All of the resulting mixture is then introduced into hydrogenator 14 through line 41. Portions of hydrocarbon diluent flowing in line 11 are introduced, via lines 42, 43, and 44, below catalyst beds 15 in hydrogenator 14. Vaporization of the diluent aids in controlling the hydrogenation exotherm.

As indicated above, suitable hydrocarbon diluents which may be employed in the flow scheme of the drawing and recovered as a sidestream from decyclopentenizer 26 include $C_6$ to $C_9$ aliphatic, cyclic, and aromatic hydrocarbons, as well as hydrocarbon fractions boiling between cyclopentane and dicyclopentadiene. In addition, aliphatic, cyclic, and aromatic hydrocarbon diluents boiling higher than dicyclopentadiene may be employed in the flow arrangement of the drawing, since essentially no dicyclopentadiene is present in stream 25. As will be recognized by those skilled in the art, such higher boiling diluents will be selected from those materials which are more volatile than any hydrogenated materials leaving decyclopentenizer 26 through line 36. When employing such higher boiling diluents the liquid product exiting knockout pot 8 through line 9 is preferably subjected to flashing or distillation to recover any diluent contained in said liquid product.

Where propane, butane, isobutane, pentane, isopentane, or mixtures of them are employed as the hydrocarbon diluent, the materials leaving decyclopentenizer 26 as top and sidestream products are reversed; that is, product cyclopentene is recovered as the sidestream, and hydrocarbon diluent exits as the top product and is thereafter recycled. Alternatively, a two column distillation configuration may be employed, the first column of which overheads the diluent, and the second of which, being fed the bottoms from the first, has a top product of cyclopentene and a bottom product of hydrogenated $C_{10}$ and heavier materials.

A two column resolution scheme may also be employed where a $C_6$ to $C_9$ aliphatic, cyclic, or aromatic hydrocarbon or hydrocarbon fraction is employed as the diluent. Here, the liquid product leaving phase separator 34 and flowing in line 25 is fed to the first column, from which cyclopentene leaves as the top product. The second column, to which is fed the bottoms of the first column, separates the diluent, and hydrogenated $C_{10}$ and higher materials as top and bottom products, respectively. Subject to the precautions noted above with respect to the drawing, a diluent boiling higher than dicyclopentadiene may also be employed in such a two column resolution scheme.

EXAMPLES

The following examples will further illustrate this invention, but the invention is not restricted to the conditions cited.

Example I

A steam-heated heat exchanger, an one inch I.D. by three foot 304 stainless steel cracking tube, a transfer line, and a similarly sized 304 stainless steel hydrogenation tube were arranged in series. The first portions of the cracking and hydrogenation tubes functioned as preheaters for those respective reactions. To the hydrogenation tube was charged a mixture consisting of 50 cc. of a sulfided hydrogenation catalyst (Type Ni 0301 T, manufactured by Harshaw Chemical Company) and 180 cc. of inert silicon carbide. The steam preheater was maintained at 160° C. Temperatures in the cracking and hydrogenation tubes were maintained at 285°–290° C., and at 275°–290° C., respectively, by the use of an electric heating furnace. Dicyclopentadiene diluted with isopentane was mixed with hydrogen and heated to approximately 160° C. in the steam-heated preheater, and then forced under pressure down through the cracking tube, through the transfer line, and up through the catalyst filled hydrogenation tube.

The hydrocarbon feed rate consisted of 140 g./hr., being 25 percent by weight dicyclopentadiene. Hydrogen flow to the reactor for the first 9.5 hours was 6.8 gm. moles/hr. (equivalent to 25.7 moles/mole of dicyclopentadiene), and was raised to 11 gm. moles per hr. (41.6 moles/mole of dicyclopentadiene) for the remaining five hours. During the first 9.5 hours, the pressure was maintained at 70–75 p.s.i.g. by a pressure control valve, and 150–170 p.s.i.g. thereafter. During the entire run, the approximate residence time in the cracking tube was 20 seconds, and the approximate feed rate to the hydrogenation reactor was equivalent to 0.6 gm. dicyclopentadiene per gm. of hydrogenation catalyst. Composition of the cyclic $C_5$s, leaving the hydrogenation reactor for the first 9.5 hours, as determined by GLC analysis, is shown in Table I.

TABLE 1

Production of cyclopentene from dicyclopentadiene by thermal cracking and selective hydrogenation in separate stages at 70–75 p.s.i.g.

| Time, hrs. | Composition of cyclic $C_5$ materials, percent by weight | | |
|---|---|---|---|
| | Cyclopentane | Cyclopentadiene | Cyclopentene |
| 1.0 | 94.0 | 0 | 6.0 |
| 2.0 | 50.0 | 0 | 50.0 |
| 3.0 | 7.0 | 0 | 93.0 |
| 3.5 | 3.2 | 1.1 | 93.7 |
| 4.5 | 1.8 | 2.9 | 95.3 |
| 6.5 | 1.5 | 3.8 | 94.7 |
| 7.5 | 1.3 | 3.9 | 94.8 |
| 8.5 | 1.1 | 4.6 | 94.3 |
| 9.5 | 0.9 | 4.8 | 94.3 |

After 9.5 hours of operation, both tubes were cooled, and the cracking tube was opened and examined for polymers and coke. None was found. Because the cyclopentadiene concentration was above the 1.0% that had been set arbitrarily, the pressure was raised to 150–170 p.s.i.g., and the hydrogen rate was increased, as indicated above. Results are indicated in Table 2.

TABLE 2

Production of cyclopentene from dicyclopentadiene by thermal cracking and selective hydrogenation in separate stages at 150–170 p.s.i.g.

| Time, hrs. | Composition of cyclic $C_5$ materials, percent by weight | | |
|---|---|---|---|
| | Cyclopentane | Cyclopentadiene | Cyclopentene |
| 1 | 3.8 | 1.1 | 95.1 |
| 2 | 3.8 | 1.1 | 95.1 |
| 3 | 5.0 | 1.0 | 94.0 |
| 4 | 5.9 | 1.0 | 93.1 |
| 5 | 5.8 | 0.7 | 93.5 |

Again both tubes were cooled and examined for polymer; again, none was found.

Example 2

A single one inch I.D. tube was divided into four sections, consisting of a preheating section packed with steel helices, a cracking section (approximately 180 cc. in volume), a transition zone packed with silicon carbide, and an hydrogenation section, packed with 50 cc. of sulfided Harshaw Ni 0301 T mixed with silicon carbide. The steam-heated feed line was maintained at 160° C. the inlet to the cracking section 295–300° C., the middle of the cracking section at 285°–295° C., and the outlet thereof at 260°–280° C. Heat was supplied to the single tube by placing it in an electric furnace.

The hydrocarbon feed rate to the tube was 140 gm./hr., and consisted of 25% dicyclopentadiene and 75% isopentane, both by weight. The pressure was maintained at 150–155 p.s.i.g. Other conditions and results of this extended run are shown in Table 3.

TABLE 3

Cracking of dimer and hydrogenation of monomer in a single tube

| Time, hrs. | H₂ feed rate, moles/hr. | Mole ratio, H₂:dimer | Hydrogenation temperatures, °C. | | Hydrogenation product | | | High boiling materials, g./100 g. dimer feed |
|---|---|---|---|---|---|---|---|---|
| | | | | | Percent by weight of total C₅'s | | | |
| | | | Feed | Outlet | Cyclopentane | Cyclopentadiene | Cyclopentene | |
| 1.5 | 10 | 37.9 | 283 | 272 | 7.5 | 0.5 | 92.0 | |
| 2.5 | 10 | 37.9 | 286 | 278 | 6.8 | 0.5 | 92.7 | |
| 3.5 | 10 | 37.9 | 286 | 276 | 6.2 | 0.4 | 93.4 | |
| 4.5 | 10 | 37.9 | 287 | 277 | 6.1 | 0.4 | 93.5 | 17 |
| 6.5 | 5 | 18.9 | 287 | 277 | 6.3 | 1.0 | 92.7 | |
| 7.5 | 5 | 18.9 | 288 | 278 | 7.7 | 1.2 | 91.1 | |
| 8.5 | 5 | 18.9 | 288 | 279 | 7.0 | 1.1 | 91.9 | 15 |
| 9.5 | 6 | 22.8 | 268 | 243 | 6.7 | 0.4 | 92.9 | |
| 10.5 | 6 | 22.8 | 263 | 236 | 5.1 | 0.3 | 94.6 | |
| 12 | 6 | 22.8 | 260 | 236 | 4.1 | 0.9 | 95.0 | 1.9 |
| 14 | 6 | 22.8 | 260 | 235 | 3.9 | 0.9 | 95.2 | |
| 16 | 6 | 22.8 | 259 | 231 | 3.9 | 1.0 | 95.1 | |
| 27 | 6 | 22.8 | 254 | 230 | 5.1 | 1.5 | 93.4 | |
| 30 | 3 | 11.4 | 255 | 231 | 6.0 | 0.9 | 93.1 | 4.0 |
| 31.5 | 3 | 11.4 | 255 | 231 | | | | 2.6 |
| 33 | 3 | 11.4 | 255 | 231 | 6.1 | 0.5 | 93.4 | 2.7 |
| 37 | 3 | 11.4 | 255 | 231 | 4.7 | 0.7 | 94.6 | 2.8 |
| 40 | 3 | 11.4 | 255 | 231 | 4.9 | 0.5 | 94.6 | 2.9 |
| 42 | 3 | 11.4 | 255 | 231 | 5.1 | 0.7 | 94.6 | |
| 51.5 | 3 | 11.4 | 255 | 231 | 6.5 | 1.1 | 92.3 | 4.6 |
| 53.5 | 3 | 11.4 | 255 | 231 | | | | 2.4 |

Example 3

For a period of 13 days, dicyclopentadiene (DCPD) diluted with toluene and hydrogen, were passed together through a cracking tube maintained at 150 p.s.i.g. The effluent from the cracking tube was sent directly to a tube containing a selective hydrogenation catalyst, wherein cyclopentadiene (CPD) was converted to cyclopentene (CP=). The stream leaving the hydrogenation reactor was sent, at atmospheric pressure, through a Dry Ice-acetone cooled trap to condense the hydrocarbons, and the crude CP= was separated by continuous distillation in a glass Oldershaw column.

Cracking conditions:

Cracking tube: A vertical, one inch ID by 40 inch long steel tube packed with ceramic ¼ inch Raschig rings The top half of the tube served to vaporize the feed and to heat the stream to cracking temperature.
Temperature: 290–310° C. in the cracking zone.
Pressure: 150 p.s.i.g.
Feed: DCPD—25% w., toluene—75% w.; 500 g./hr. (equivalent to about 2000 g. total hydrocarbon per hour per liter of space in the cracking zone).
Hydrogen feed: 10.4 g.-moles per hour (515 moles per mole of CPD produced by cracking).

Hydrogenation conditions:

Reactor: A vertical, one inch ID by 40 inch long steel tube with a 12 inch section at the inlet serving as a heat exchanger.
Catalyst: 230 cc. sulfided Harshaw Ni 0301 T nickel on alumina as ⅛ inch tablets.
Pressure: 150 p.s.i.g.
Temperature: About 220° C. at the inlet, about 265–280° C. at the hottest point in the tube.
Feed rate: 0.5 gram DCPD per gram of hydrogenation catalyst per hour.

Composition of product:      Percent by weight

| | |
|---|---|
| Cyclopentene | 93.9 |
| Cyclopentane | 4.1 |
| Cyclopentadiene | 0.4 |
| Amylenes | ¹ 0.9 |
| Unidentified | 0.3 |
| Toluene | 0.4 |

¹ Resulting from isoprene and piperylene present in the DCPD feed.

We claim as our invention:

1. A process for the conversion of dicyclopentadiene to cyclopentene which comprises the steps:
  (a) thermally depolymerizing dicyclopentadiene in the vapor phase and under superatmospheric pressure to cyclopentadiene in the presence of at least one molar proportion of hydrogen and an inert hydrocarbon diluent; and
  (b) selectively and catalytically hydrogenating the resulting cyclopentadiene, without condensation and separation from the hydrogen, to cyclopentene over an hydrogenation catalyst.

2. The process in accordance with claim 1 wherein
  (a) the temperature maintained during the thermal depolymerization is between about 200° and about 400° C.;
  (b) the molar ratio of hydrogen to dicyclopentadiene in the feed to the thermal depolymerization lies within the range of from about 5.0 to about 50.0;
  (c) the proportion of dicyclopentadiene to inert hydrocarbon diluent in the feed to the thermal depolymerization is up to 40% by weight;
  (d) the pressure maintained during the thermal depolymerization is from about 50 to about 500 p.s.i.g.; and
  (e) the hydrogenation reaction is conducted at a temperature and pressure of between about 175° and about 350° C. and about 50 to about 250 p.s.i.g., respectively.

3. The process in accordance with claim 2 wherein the inert hydrocarbon diluent is
  (a) easily separable from the group of cyclic C₅ compounds consisting of cyclopentene, cyclopentane, and cyclopentadiene, and dicyclopentadiene as a result of
    (i) having a greater volatility than any member of said group of cyclic C₅ compounds and dicyclopentadiene, or
    (ii) being less volatile than any member of said group of cyclic C₅ compounds, while at the same time being more volatile than dicyclopentadiene, or
    (iii) being less volatile than dicyclopentadiene;
  (b) exhibiting chemical inertness to conditions prevailing within the thermal depolymerization and the hydrogenation; and
  (c) having a moderate to high seat of vaporization.

4. The process in accordance with claim 3 wherein the inert hydrocarbon diluent is selected from (a) the group consisting of propane, butane, isobutane, pentane, and isopentane;
(b) saturated acyclic hydrocarbons containing 6 to 9 carbon atoms;
(c) cyclic, saturated hydrocarbons containing 6 to 9 carbon atoms;
(d) an hydrocarbon fraction boiling within the boiling point range of said cyclic and acyclic saturated hydrocarbons containing 6 to 9 carbon atoms; and
(e) aromatic hydrocarbons containing 6 to 9 carbon atoms.

5. The process in accordance with claim 4 wherein the hydrogenation catalyst is selected from the group consisting of nickel sulfide and nickel supported on an inert carrier, the latter being sulfided prior to use.

6. A process for the conversion of dicyclopentadiene to cyclopentene which comprises the steps:
(a) mixing recycle hydrogen and recycle, inert hydrocarbon diluent with dicyclopentadiene;
(b) passing the combined stream from step (a) to a cracking zone wherein the dicyclopentadiene is thermally depolymerized to cyclopentadiene;
(c) cooling the effluent from the cracking zone by the addition thereto of additional inert hydrocarbon diluent;
(d) flashing the cooled, cracking zone effluent of step (c) to produce a liquid product comprising any unconverted dicyclopentadiene and any refractory polymer produced in step (b) and a vapor product comprising hydrogen, cyclopentadiene and inert hydrocarbon diluent;
(e) further cooling the vapor product from step (d) with additional inert hydrocarbon diluent and mixing thereafter with additional hydrogen;
(f) selectively hydrogenating the cyclopentadiene in the inert hydrocarbon-diluted and -cooled vapor from step (e) over a sulfided nickel catalyst in an hydrogenation zone;
(g) cooling and flashing the effluent from the hydrogenation zone to produce a vapor consisting essentially of hydrogen, and a liquid comprising essentially cyclopentene and inert hydrocarbon diluent;
(h) separating the liquid from step (g), in one or a plurality of distillation zones, into products consisting essentially of cyclopentene, inert hydrocarbon diluent, and any $C_{10}$ and heavier materials present in the liquid from step (g);
(i) recycling the inert hydrocarbon diluent recovered in step (g), after the addition thereto of makeup diluent, to steps (a), (c), and (e); and
(j) recycling the hydrogen recovered in step (g), after the addition thereto of makeup hydrogen, to steps (a) and (c).

7. The process in accordance with claim 6 wherein
(i) the temperature maintained during the thermal depolymerization of step (a) is between about 200° and about 400° C.;
(ii) the molar ratio of hydrogen to dicyclopentadiene in the combined stream from step (a) lies within the range of from about 5.0 to about 50.0;
(iii) the proportion of dicyclopentadiene to inert hydrocarbon diluent in the combined stream from step (a) is up to 40% by weight;
(iv) the pressure maintained during the thermal depolymerization of step (b) is from about 50 to about 500 p.s.i.g.; and
(v) the hydrogenation reaction of step (f) is conducted at a temperature and pressure of between about 175° and about 350° C. and about 50 to about 250 p.s.i.g., respectively.

8. The process in accordance with claim 7 wherein the inert hydrocarbon diluent is selected from
(a) the group consisting of propane, butane, isobutane, pentane, and isopentane;
(b) saturated acyclic hydrocarbons containing 6 to 9 carbon atoms;
(c) cyclic, saturated hydrocarbons containing 6 to 9 carbon atoms;
(d) an hydrocarbon fraction boiling within the boiling point range of said cyclic and acyclic saturated hydrocarbons containing 6 to 9 carbon atoms; and
(e) aromatic hydrocarbons containing 6 to 9 carbon atoms.

References Cited
UNITED STATES PATENTS

| | | | |
|---|---|---|---|
| 2,887,517 | 5/1959 | Noeske et al. | 260—666A |
| 2,831,904 | 4/1958 | Kreps | 260—666A |
| 3,016,410 | 1/1962 | Dick et al. | 260—666A |
| 2,801,270 | 7/1957 | Nelson et al. | 260—666A |
| 2,913,504 | 11/1959 | Hillard, Jr. et al. | 260—666A |
| 2,402,493 | 6/1946 | Greensfelder | 260—683 |
| 3,251,892 | 5/1966 | Seefelder et al. | 260—666A |

DELBERT E. GANTZ, Primary Examiner

V. O'KEEFE, Assistant Examiner